(12) United States Patent
Yoon et al.

(10) Patent No.: US 11,105,032 B2
(45) Date of Patent: Aug. 31, 2021

(54) WASHING MACHINE APPLIANCE AND METHODS FOR OPERATING THE SAME IN A CALIBRATION CYCLE

(71) Applicant: Haier US Appliance Solutions, Inc., Wilmington, DE (US)

(72) Inventors: Je Kwon Yoon, Seongnam (KR); JaeHyo Lee, Seoul (KR); Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 285 days.

(21) Appl. No.: 15/949,122

(22) Filed: Apr. 10, 2018

(65) Prior Publication Data
US 2019/0309460 A1 Oct. 10, 2019

(51) Int. Cl.
*D06F 39/08* (2006.01)
*G05B 13/02* (2006.01)
*D06F 33/34* (2020.01)
*D06F 103/18* (2020.01)
*D06F 105/04* (2020.01)
*D06F 105/08* (2020.01)
*D06F 105/52* (2020.01)
*D06F 105/58* (2020.01)
*D06F 33/42* (2020.01)

(52) U.S. Cl.
CPC .......... *D06F 33/34* (2020.02); *G05B 13/026* (2013.01); *D06F 33/42* (2020.02); *D06F 39/087* (2013.01); *D06F 2103/18* (2020.02); *D06F 2105/04* (2020.02); *D06F 2105/08* (2020.02); *D06F 2105/52* (2020.02); *D06F 2105/58* (2020.02)

(58) Field of Classification Search
CPC ..... G05B 13/026; D06F 33/00; D06F 39/087; D06F 33/34; D06F 33/42; D06F 2204/088; D06F 2204/084; D06F 2105/04; D06F 2105/08; D06F 2103/18; D06F 2105/58; D06F 2105/52
See application file for complete search history.

(56) References Cited

U.S. PATENT DOCUMENTS 2,869,347 A * 1/1959 Gray, Jr. ............... D06F 39/087
 68/207
4,696,171 A * 9/1987 Babuin ................... D06F 33/00
 68/207

(Continued)

FOREIGN PATENT DOCUMENTS

DE 4222240 A1 1/1994
EP 2413106 A1 2/2012

OTHER PUBLICATIONS

Machine Translation of DE 4222240 A1 to Stiller, Jan. 1994. (Year: 1994).*

*Primary Examiner* — Benjamin L Osterhout
(74) *Attorney, Agent, or Firm* — Dority & Manning, P.A.

(57) ABSTRACT

A washing machine appliance and methods for operating the same are provided. The washing machine appliance includes features for executing a calibration cycle in which water flow rates through one or more valves may be calculated and water pressure conditions may be detected and identified. Further, in some instances, the flow rate setting of the washing machine appliance may be adapted or modified in accordance with the flow rates calculated during the calibration cycle.

20 Claims, 4 Drawing Sheets

(56) References Cited

U.S. PATENT DOCUMENTS

| | | | |
|---|---|---|---|
| 2012/0024080 A1* | 2/2012 | Carbone, II | G01F 25/0007 |
| | | | 73/861.04 |
| 2013/0312201 A1 | 11/2013 | Frucco | |
| 2014/0109644 A1* | 4/2014 | Carbone, II | G01F 25/0092 |
| | | | 73/1.16 |
| 2015/0292136 A1 | 10/2015 | Leonard et al. | |

* cited by examiner

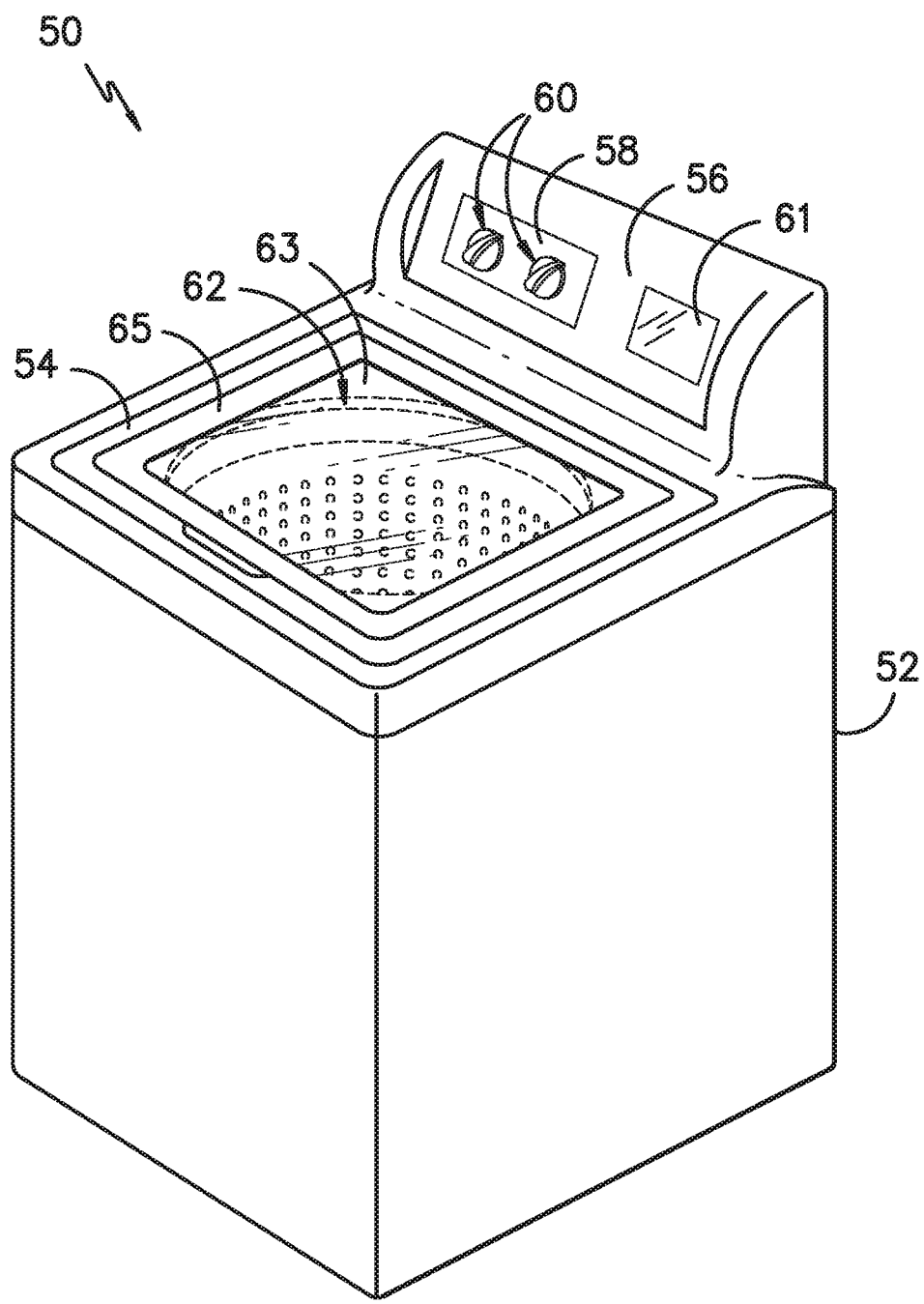
FIG. -1-

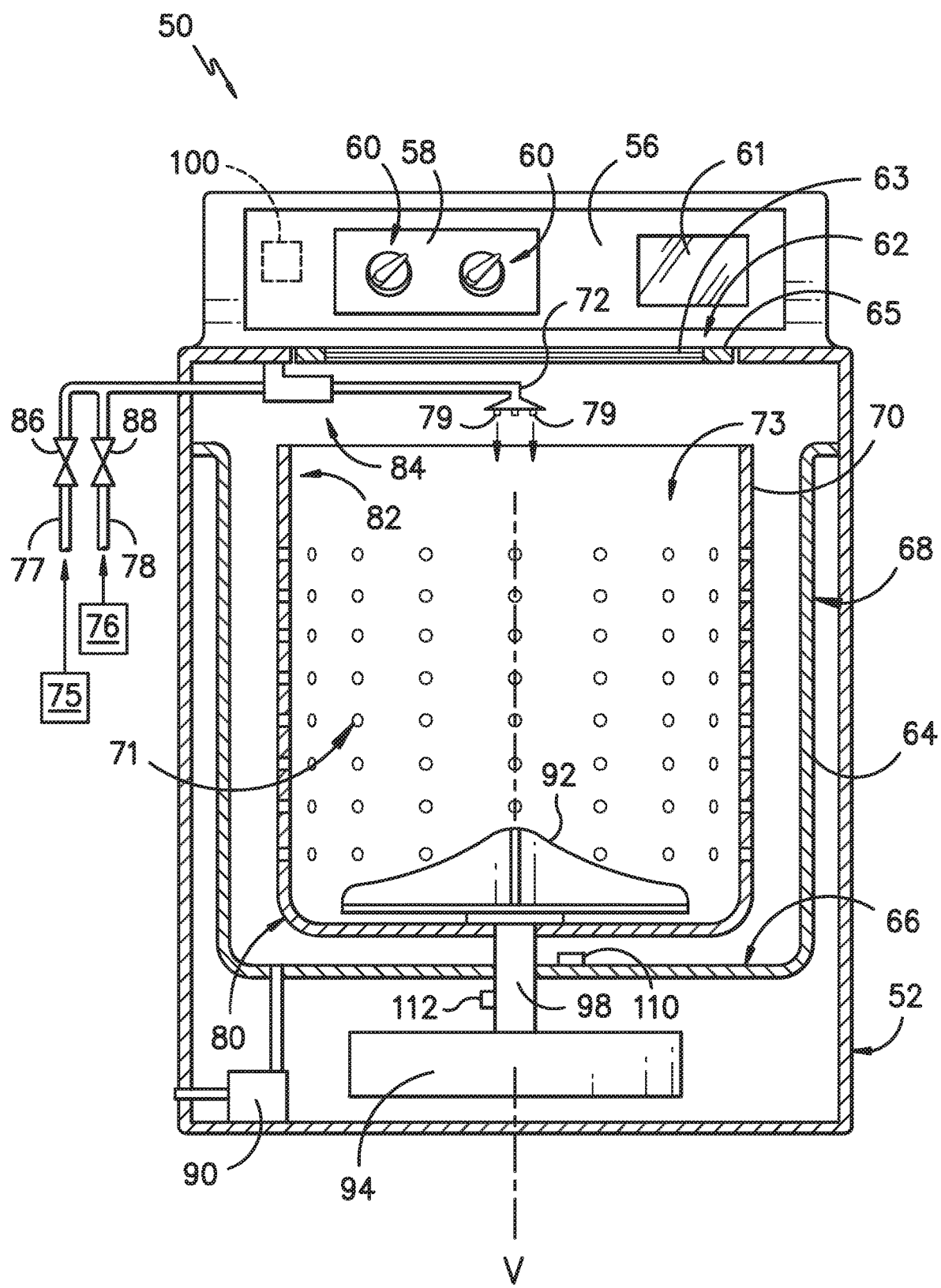
FIG. -2-

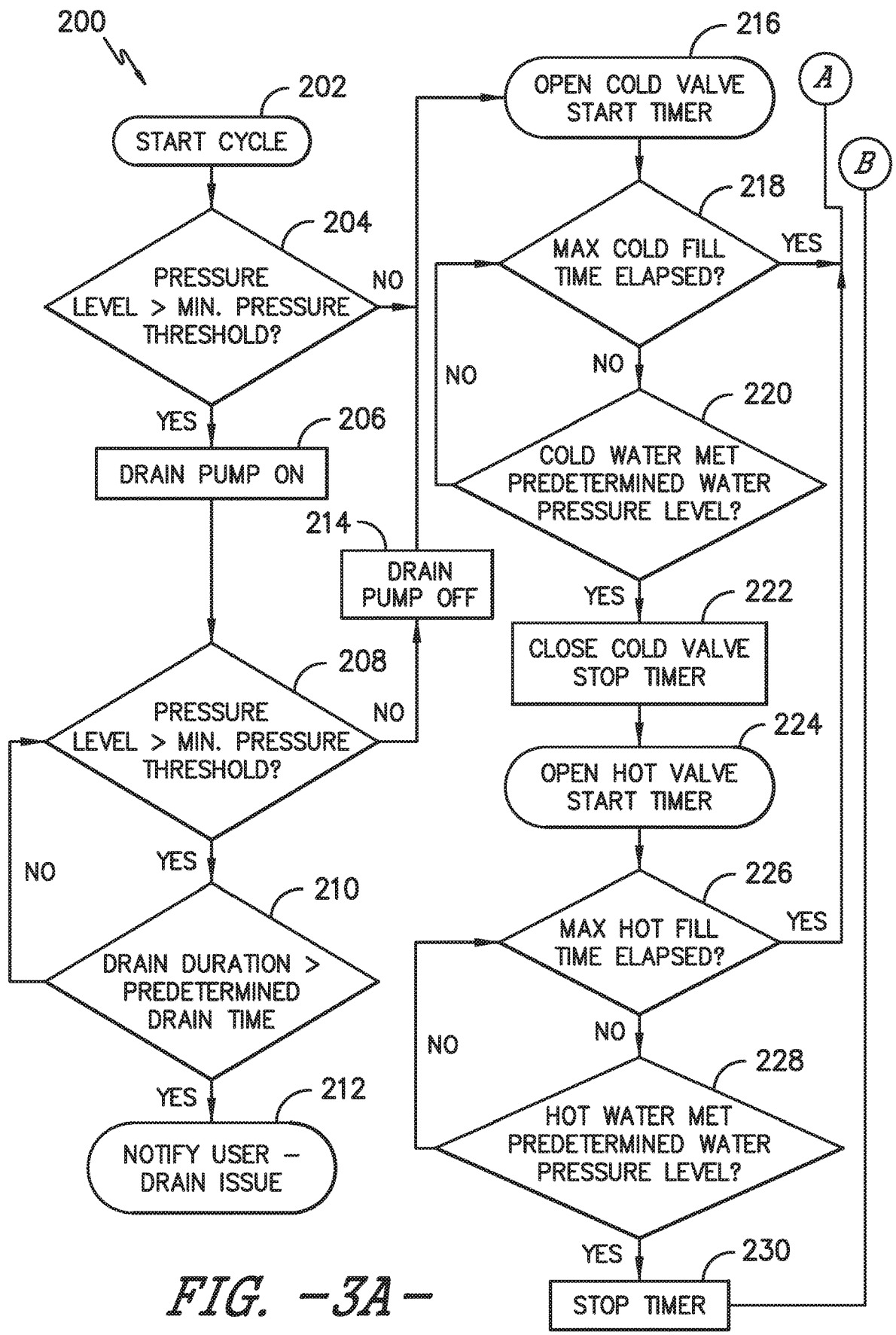
FIG. -3A-

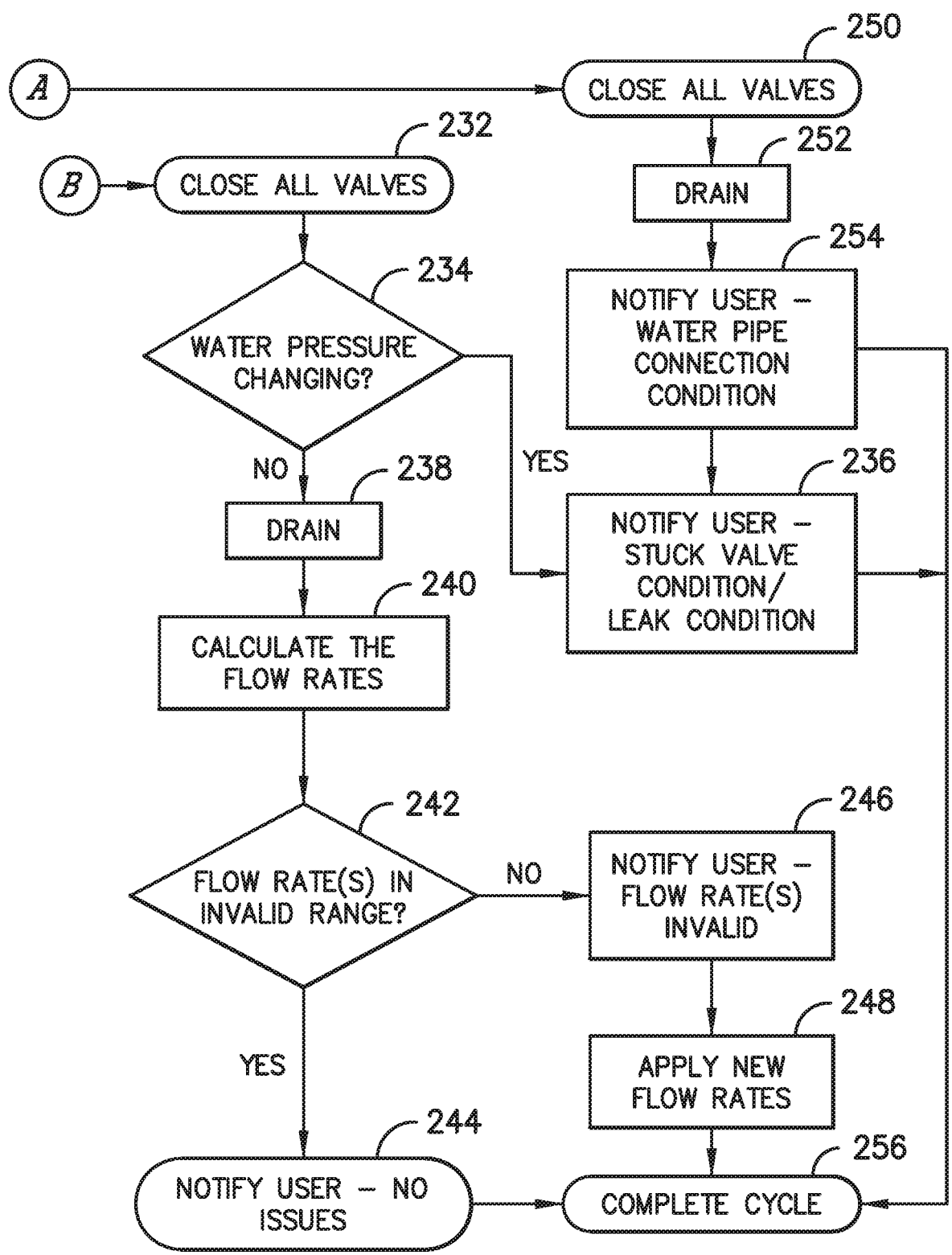
FIG. -3B-

# WASHING MACHINE APPLIANCE AND METHODS FOR OPERATING THE SAME IN A CALIBRATION CYCLE

FIELD OF THE INVENTION

The present disclosure relates generally to washing machine appliances, and more particularly to methods and apparatus for operating washing machine appliances that calibrate water flow rates and detect and resolve filling and draining issues.

BACKGROUND OF THE INVENTION

Washing machine appliances generally include a tub for containing wash fluid, e.g., water and detergent, bleach and/or other wash additives. A basket is rotatably mounted within the tub and defines a wash chamber for receipt of articles for washing. During operation of such washing machine appliances, wash fluid is directed into the tub and onto articles within the wash chamber of the basket. The basket or an agitation element can rotate at various speeds to agitate articles within the wash chamber in the wash fluid, to wring wash fluid from articles within the wash chamber, etc.

Inlet water flow rates are frequently used as parameters for calculating the volume of water flowing into the tub. The volume of water flowed into the tub greatly influences the washing, rinsing, detangling, and cloth damage performance of the washing machine appliance. Some conventional washing machine appliances use a fixed flow rate setting to determine the volume of water flowing into the tub. In many areas of the world, the inlet pressure of water flowed into the tub does not correlate with the factory setting fixed flow rate. Low pressure inlet water flow can lead to inadequate water in the washing machine appliance during operation, leading to poor performance and user dissatisfaction. Conventional washing machine appliances have no ability to adapt the flow rate setting in the control logic to account for the water pressure conditions actually experienced by the washing machine appliance.

Moreover, some conventional washing machine appliances have no means to detect or identify the cause of the water pressure issues of the water flowing into the tub. Accordingly, service professionals or users must run a series of tests to diagnose the cause of the issues, which may be inconvenient. Some washing machine appliances utilize flow regulators to regulate the water pressure into the appliances and to calculate the actual flow rates of water flowing into the tub. However, the addition of a flow regulator to a washing machine appliance increases the cost of the appliance. Additionally, at extreme low pressures, flow regulators will not function properly.

Accordingly, improved washing machine appliances and methods for operating the same that address one or more of the challenges noted above would be useful.

BRIEF DESCRIPTION OF THE INVENTION

Aspects and advantages of the invention will be set forth in part in the following description, or may be apparent from the description, or may be learned through practice of the invention.

In accordance with one embodiment of the present disclosure, a method for operating a washing machine appliance in a calibration cycle is provided. The method includes opening a valve to flow water into a tub. The method also includes closing the valve if a max fill time has elapsed or if water flowing into the tub has met a predetermined water pressure level. Further, the method includes calculating, if water flowing into the tub has met the predetermined water pressure level, a water flow rate based at least in part on a fill time extending from a time in which the valve opens to a time in which the valve closes. The water flow rate is also calculated based at least in part on a pressure of the water in the tub at the predetermined water pressure level. The method also includes determining whether the water flow rate is in a valid range. In addition, the method includes generating a control action in response to whether the water flow rate is in the valid range.

In accordance with another embodiment of the present disclosure, a washing machine appliance configured for operating a calibration cycle is provided. The washing machine appliance includes a tub and a basket rotatably mounted within the tub. The basket defines a wash chamber for receipt of articles for washing. The washing machine appliance also includes a valve in fluid communication with an external water source, the valve configured to selectively allow water to flow into tub. The washing machine appliance further includes a nozzle in fluid communication with the valve and configured for flowing water into the tub. Moreover, the washing machine appliance includes a pressure sensor mounted in the tub. In addition, the washing machine appliance includes a controller in operative communication with the valve and the pressure sensor, the controller configured to: open the valve to flow water into the tub; close the valve if a max fill time has elapsed or if water flowing into the tub has met a predetermined water pressure level; calculate, if water flowing into the tub has met the predetermined water pressure level, a water flow rate based at least in part on a fill time extending from a time in which the valve opens to a time in which the valve closes and a pressure of water in the tub at the predetermined water pressure level; determine whether the water flow rate is in a valid range; and generate a control action in response to whether the water flow rate is in the valid range.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance according to an exemplary embodiment of the present subject matter;

FIG. 2 provides a front, section view of the washing machine appliance of FIG. 1; and FIGS. 3A and 3B provide a flow chart of an exemplary method for operating a calibration cycle in a washing machine appliance according to an exemplary embodiment of the present subject matter.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a washing machine appliance 50 according to an exemplary embodiment of the present subject matter. As shown in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features. In some embodiments, a display 61 indicates selected features, a countdown timer, and/or other items of interest to users. A lid 62 is mounted to cover 54 and is rotatable between an open position (not shown) facilitating access to a wash tub 64 (FIG. 2) located within cabinet 52 and a closed position (shown in FIG. 1) forming an enclosure over tub 64.

For this exemplary embodiment, lid 62 includes a transparent panel 63, which may be formed of glass, plastic, or any other suitable material, for example. The transparency of the panel 63 allows users to see through the panel 63 and into the tub 64 when the lid 62 is in the closed position. In some embodiments, the panel 63 may itself generally form the lid 62. In other embodiments, the lid 62 may include the panel 63 and a frame 65 surrounding and encasing the panel 63. Alternatively, panel 63 need not be transparent.

FIG. 2 provides a front, cross-sectional view of washing machine appliance 50. As shown in FIG. 2, tub 64 includes a bottom wall 66 and a sidewall 68. A wash drum or wash basket 70 is rotatably mounted within tub 64. In particular, for this embodiment, basket 70 is rotatable about a vertical axis V. Thus, washing machine appliance is generally referred to as a vertical axis washing machine appliance. Basket 70 defines a wash chamber 73 for receipt of articles for washing and extends, e.g., vertically between a bottom portion 80 and a top portion 82. Basket 70 includes a plurality of openings or perforations 71 therein to facilitate fluid communication between an interior of basket 70 and tub 64.

A nozzle 72 is configured for flowing a liquid into tub 64, e.g., water. In particular, nozzle 72 may be positioned at or adjacent top portion 82 of basket 70. Nozzle 72 is in fluid communication with one or more water sources 75, 76 in order to direct liquid into tub 64 and/or onto articles within chamber 73 of basket 70. Nozzle 72 may further include apertures 79 through which water may be sprayed into the tub 64. Apertures 79 may, for example, be tubes extending from the nozzles 72 as illustrated, or simply holes defined in the nozzles 72 or any other suitable openings through which water may be sprayed. Nozzle 72 may additionally include other openings, holes, etc. (not shown) through which water may be flowed, i.e. sprayed or poured, into the tub 64.

A cold water valve 86 and a hot water valve 88 regulate the flow of fluid through nozzle 72. Cold water valve 86 and hot water valve 88 are selectively adjustable between a closed position and an open position. For example, cold water valve 86 and hot water valve 88 can selectively adjust to a closed position in order to terminate or obstruct the flow of fluid through nozzle 72. Conversely, one or both of cold water valve 86 and hot water valve 88 can selectively adjust to an open position in order to allow a flow of fluid through nozzle 72. The valves 86, 88 are in fluid communication with one or more external water sources. For this embodiment, cold water valve 86 is in fluid communication with a cold water source 75 and hot water valve 88 is in fluid communication with hot water source 76. The cold water source 75 may, for example, be a commercial water supply, while the hot water source 76 may be, for example, a water heater. Such external water sources 75, 76 may supply water to the appliance 50 through their respective valves 86, 88. A cold water conduit 77 and a hot water conduit 78 may supply cold and hot water, respectively, from the sources 75, 76 through their respective valves 86, 88. Valves 86, 88 may further be operable to regulate the flow of hot and cold liquid, and thus the temperature of the resulting liquid flowed into tub 64, such as through the nozzle 72. Although valves 86, 88 are shown as separate valves, it will be appreciated that a single valve having cold and hot water ports may be used in alternative exemplary embodiments. Further, in some embodiments, washing machine appliance may include multiple cold water valves and/or multiple hot water valves.

An additive dispenser 84 may additionally be provided for directing a wash additive, such as detergent, bleach, liquid fabric softener, etc., into the tub 64. For example, dispenser 84 may be in fluid communication with nozzle 72 such that water flowing through nozzle 72 flows through dispenser 84, mixing with wash additive at a desired time during operation to form a liquid or wash fluid, before being flowed into tub 64. In some embodiments, nozzle 72 is a separate downstream component from dispenser 84. In other embodiments, nozzle 72 and dispenser 84 may be integral, with a portion of dispenser 84 serving as the nozzle 72. A drain pump assembly 90 (shown schematically in FIG. 2) is located beneath tub 64 and basket 70 for gravity assisted flow to drain tub 64.

An agitation element 92, shown as an impeller in FIG. 2, may be disposed in basket 70 to impart an oscillatory motion to articles and liquid in chamber 73 of basket 70. In various exemplary embodiments, agitation element 92 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 92 is oriented to rotate about the vertical axis V. Alternatively, basket 70 may provide such agitating movement, and agitation element 92 is not required. Basket 70 and agitation element 92 are driven by a motor 94, such as e.g., a pancake motor. As motor output shaft 98 is rotated, basket 70 and agitation element 92 are operated for rotatable movement within tub 64, e.g., about vertical axis V. Washing machine appliance 50 may also include a brake assembly (not shown) selectively applied or released for respectively maintaining basket 70 in a stationary position within tub 64 or for allowing basket 70 to spin within tub 64.

Various sensors may additionally be included in the washing machine appliance 50. For this embodiment, for example, washing machine appliance includes a pressure sensor 110 positioned in the tub 64 as illustrated in FIG. 2. Any suitable pressure sensor 110, such as an electronic sensor, a manometer, or another suitable gauge or sensor, may be utilized. The pressure sensor 110 may generally measure the pressure of water in the tub 64. This pressure can then be utilized to estimate the volume of water in the tub 64 as well as the fill rate of the tub. Additionally, a suitable speed sensor 112 can be connected to the motor 94, such as to the output shaft 98 thereof, to measure speed and indicate operation of the motor 94. Other suitable sensors, such as temperature sensors, etc., may additionally be provided in the washing machine appliance 50.

Referring still to FIG. 2, operation of washing machine appliance 50 is controlled by a processing device or controller 100 that is operatively coupled to the input selectors 60 located on washing machine backsplash 56 (shown in FIG. 1) for user manipulation to select washing machine cycles and features. Controller 100 is further operatively coupled to various other components of appliance 50, such as cold and hot water valves 86, 88, drain pump 90, motor 94, pressure sensor 110, speed sensor 112, and other suitable sensors, etc. In response to user manipulation of the input selectors 60, controller 100 may operate the various components of washing machine appliance 50 to execute selected machine cycles and features.

Controller 100 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 100 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 may be in communication with controller 100 via one or more signal lines or shared communication busses.

In an illustrative embodiment, a load of laundry articles are loaded into chamber 73 of basket 70, and washing operation is initiated through operator manipulation of control input selectors 60. Tub 64 is filled with water and mixed with detergent to form a liquid or wash fluid. One or both of cold and hot water valves 86, 88 can be opened to initiate a flow of water into tub 64 via nozzle 72, and tub 64 can be filled to the appropriate level for the amount of articles being washed. Once tub 64 is properly filled with wash fluid, the contents of the basket 70 are agitated with agitation element 92 or by movement of the basket 70 for cleaning of articles in basket 70. More specifically, agitation element 92 or basket 70 is moved back and forth in an oscillatory motion.

After the agitation phase of the wash cycle is completed, tub 64 is drained. Laundry articles can then be rinsed by again adding fluid to tub 64, depending on the particulars of the cleaning cycle selected by a user, agitation element 92 or basket 70 may again provide agitation within basket 70. One or more spin cycles may also be used. In particular, a spin cycle may be applied after the wash cycle and/or after the rinse cycle in order to wring wash fluid from the articles being washed. During a spin cycle, basket 70 is rotated at relatively high speeds.

While described in the context of specific embodiments of washing machine appliance 50, using the teachings disclosed herein it will be understood that washing machine appliance 50 is provided by way of example only. Other washing machine appliances having different configurations (such as horizontal-axis washing machine appliances), different appearances, and/or different features may also be utilized with the present subject matter as well.

Further, the water flow rates through cold and hot water valves 86, 88 are used as parameters to calculate the volume of water in the tub 64. The volume of water in the tub greatly influences the performance in washing, rinsing, detangling, and cloth damage. Accordingly, in accordance with exemplary aspects of the present disclosure, an exemplary method for operating washing machine appliance 50 in a calibration cycle to determine the water flow rates through cold and hot water valves 86, 88 is provided below. Further, a method for detecting a cause of water pressure issues in washing machine appliance 50 is also provided.

FIGS. 3A and 3B provide a flow chart of an exemplary method (200) for operating a washing machine appliance in a calibration cycle according to an exemplary embodiment of the present subject matter. Method (200) is applicable to any suitable washing machine appliance, such as e.g., horizontal axis washing machine appliances or the exemplary washing machine appliance 50 described above with reference to FIGS. 1 and 2. For instance, controller 100 of washing machine appliance 50 may perform method (200), which may receive inputs from and transmit outputs to various components of the appliance 50. Thus, to provide context to method (200), reference numerals indicating the features of the washing machine appliance 50 of FIGS. 1 and 2 will be utilized below.

Generally, method (200) provides for calculation of flow rates of water through the valves of a washing machine appliance. The calculated flow rates may then be used, in some instances, to calculate the volume of water in the tub for future wash cycles to optimize wash performance, rinsing, detangling, and cloth damage. Further method (200) provides for detection of stuck valve issues, water pipe connection issues, as well as draining issues.

At (202), method (200) includes commencing the calibration cycle. The calibration cycle may be commenced in a number of suitable ways. For instance, a user may commence the calibration cycle. For example, a user may manipulate one or more input selectors 60 of control panel 58. As another example, a user may trigger the calibration cycle by utilizing an application on a remote user device communicatively coupled with controller 100 of washing machine appliance 50. Another suitable manner for commencing the calibration cycle include commencing the calibration cycle at a predetermined interval, such as e.g., every week, every month, etc. In this manner, the calibration cycle may be performed without user interaction with washing machine appliance 50. Yet another suitable manner for commencing the calibration cycle includes embedding the calibration cycle into another cycle, such as e.g., a basket clean cycle in which the basket 70 is self-cleaned. In this way, when such other cycles are selected by a user or run automatically by washing machine appliance 50, the calibration cycle is likewise performed.

At (204), method (200) includes determining whether a water pressure level of water within the tub is greater than a minimum pressure threshold. Stated differently, at (204), it is determined whether water is present in tub 64. Thus, in some implementations, the minimum pressure threshold may be a water pressure of zero (0) or some other nominal amount. Preferably, water is emptied from tub 64 prior to flowing water into tub 64 to calculate water flow rates, as will be discussed further below. In this way, more accurate flow rates may be obtained and fewer calculations need to be performed by controller 100, thereby saving the processing resources of controller 100 to perform other tasks.

The water pressure level of water within tub 64 may be determined based at least in part on one or more signals received by controller 100 from pressure sensor 110. If the water pressure level is greater than the minimum pressure threshold, then method (200) proceeds to (206) so that water may be drained from tub 64. If, however, the water pressure level is not greater than the minimum pressure threshold, then method (200) proceeds to (216) so that water flow rates may be calibrated and ultimately calculated.

At (206), (208), and (210), if the water pressure level of the water within the tub is greater than the minimum pressure threshold, method (200) includes draining the water from the tub until the water pressure level is less than or equal to the minimum pressure threshold or if a predetermined drain time has elapsed. As shown in FIG. 3A, at (206), method (200) includes activating a drain pump. For instance, drain pump 90 may be activated by controller 100 to drain water from tub 64 upon receiving one or more signals from pressure sensor 110 that are indicative that water is present in tub 64. Drain pump 90 drains water from tub 64 until one of the conditions is met at (208) or (210). At (208) method includes determining whether the water pressure level is less than or equal to the minimum pressure threshold. As noted above, the minimum pressure threshold may be a water pressure of zero (0) or some other nominal amount. If the water pressure level is less than or equal to the minimum pressure threshold at (208), then tub 64 has been sufficiently drained to proceed with calculating the water flow rates and method (200) proceeds to (214) where method (200) includes deactivating the drain pump 90. If, however, the water pressure level is not less than or equal to the minimum pressure threshold as determined at (208), method (200) proceeds to (210). At (210), method (200) includes determining whether a predetermined drain time has elapsed. The predetermined drain time may be a time in which, under normal draining conditions, the entire tub 64 can be drained by drain pump 90. As one example, the predetermined drain time may be four (4) minutes. At (210), if the predetermined drain time has not elapsed, then method (200) loops back to (208) where controller 100 checks whether drain pump 90 has drained water from tub 64. Method (200) iterates through (208) and (210) until water is drained from tub 64 or until the predetermined drain time has elapsed. If the predetermined time has elapsed as determined at (210) before tub 64 is drained below the minimum pressure threshold, method (200) proceeds to (212).

At (212), method (200) includes notifying a user that a drain condition exists. The drain condition may be caused by a failure in drain pump 90, a failure in pressure sensor 110, or both, for example. For instance, if drain pump 90 has failed and cannot remove the water from tub 64 within the predetermined drain time, controller 100 recognizes that washing machine appliance 50 has a draining issue, and accordingly, a user is notified of such drain condition. Further, if pressure sensor 110 has failed, controller 100 might not recognize that drain pump 90 has indeed removed water from tub 64. Thus, controller 100 determines that a drain condition exists.

Washing machine appliance 50 may notify a user that a drain condition exists in a number of suitable manners. As one example, washing machine appliance 50 may include a speaker that audibly communicates the notification to a user. As another example, washing machine appliance 50 may include a communication interface that is operably connected with controller 100. The communication interface may include a network interface that provides for communication over a network, such as e.g., a wireless network. In such implementations, washing machine appliance 50 may send notifications to a user's mobile device, such as e.g., a cell phone. In further implementations of method (200), additionally or alternatively, method (200) includes logging a drain condition fault. In this way, for example, if washing machine appliance 50 is serviced, an operator, service professional, or consumer may quickly ascertain the issue with washing machine appliance 50.

At (214), if at (208) it is determined that the water pressure level is less than or equal to the minimum pressure threshold, then method (200) includes deactivating the drain pump. If tub 64 has been sufficiently drained as determined at (208), then drain pump 90 may be shutoff to conserve energy and so that method (200) may proceed with calculating the water flow rates. Accordingly, after deactivating drain pump 90 at (214), method (200) proceeds to (216).

At (216), method (200) includes opening a valve to flow water into a tub. For instance, the valve may be the cold water valve 86 of FIG. 2. Cold water valve 86 may be opened based on one or more signals from controller 100 instructing cold water valve 86 to modulate to an open position. When cold water valve 86 is moved to an open position, water from external water source 75 may flow through cold water conduit 77, through the opened cold water valve 86, and ultimately into tub 64 through nozzle 72. Preferably, cold water valve 86 is moved to a fully open position.

In some implementations, at (216), method (200) includes starting a timer. For instance, the timer may be an onboard component of controller 100, or alternatively, timer may be an offboard component that is communicatively coupled with controller 100. Preferably, timer is started simultaneously with or upon the valve being opened. By starting the timer, a fill time may be kept. The fill time, as will be explained below, is a time that extends from the valve opening to a valve closing. Stated alternatively, the fill time extends from a time in which the valve opens to a time in which the valve closes.

At (218), (220), and (222), method (200) includes closing the valve if a max fill time has elapsed or if water flowing into the tub has met a predetermined water pressure level. As shown in FIG. 3A, after the cold water valve 86 is opened at (216) to flow water into tub 64, cold water valve 86 remains open until the condition at (218) or the condition at (220) is met. As depicted in FIG. 3, for this implementation, at (218) method (200) includes determining whether a max fill time has elapsed. For this exemplary implementation, the max fill time is a max cold fill time. The max fill time may be any suitable time that allows water to fill into tub 64, e.g., thirty seconds (30 s), one minute (1 min.), or some other suitable time. Preferably, in some implementations, the max fill time is set such that under normal conditions (i.e., all components of washing machine appliance 50 and components fluidly connected thereto are in working order) water is allowed to flow into tub 64 such that the predetermined water pressure level may be met. In this way, the cold water valve 86 will allow a volume of water into tub 64 that will meet the predetermined water pressure level each time calibration cycle is run unless washing machine appliance 50 is experiencing some issue.

If the max cold fill time has not elapsed as determined at (218), method (200) proceeds to (220). At (220), as tub 64 continues to fill with water, method (200) includes determining whether the water flowing into the tub has met a predetermined water pressure level. For instance, controller 100 may receive one or more signals from pressure sensor 110 indicative of the water pressure applied to pressure sensor 110 by the water filling into tub 64. In this way, controller 100 may track the water pressure level of the water within tub 64. The predetermined water pressure level may be any suitable pressure level, such as e.g., ten (10) inches of water. At (220), if water flowing into the tub has not met the predetermined water pressure level, then method (200) loops back to (218) where controller 100 checks whether the max cold fill time has elapsed. Method (200) iterates through (218) and (220) until the max fill time has elapsed or if the water flowing into the tub has met the predetermined water pressure level. If the max cold fill time has elapsed as determined at (218) prior to when water flowing into the tub has met the predetermined water pressure level, method (200) proceeds to (250). If, however, the water flowing into the tub 64 has met the predetermined water pressure level as determined at (220) prior to the max cold fill time elapsing, method (200) proceeds to (222) where the valve is closed and the timer is stopped. The timer, having started on the valve opening and having ended on the valve closing, has kept the cold fill time. The cold fill time may be stored in one or more of the memory devices of controller 100 such that it may be used for calculating the water flow rate through the cold water valve 86. Further, once cold water valve 86 is closed, the flow rate for the hot water valve 88 may now be calculated as method (200) proceeds to (224).

At (224), method (200) includes opening a hot water valve to flow water into the tub. Largely, the same process is followed for the hot water valve 88 as described above for the cold water valve 86. Indeed, the process described above for cold water valve 86 may be repeated for each valve of washing machine appliance 50. Notably, before opening hot water valve 88, it is preferred that cold water valve 86 be closed at (222). In this way, more accurate results for each valve of washing machine appliance 50 may be achieved.

Hot water valve 88 may be opened based on one or more signals from controller 100 instructing hot water valve 88 to modulate to an open position. When hot water valve 88 is moved to an open position, water from external hot water source 76 may flow through hot water conduit 78, through the opened hot water valve 88, and ultimately into tub 64 through nozzle 72. Preferably, hot water valve 88 is moved to a fully open position.

In some implementations, at (224), method (200) includes starting a timer. Preferably, timer is started simultaneously with or upon hot water valve 88 being opened. By starting the timer, a hot fill time may be kept. The hot fill time, as will be explained below, is a time that extends from the hot water valve opening to the hot water valve closing. Stated differently, the hot fill time extends from a time in which the hot water valve opens to a time in which the hot water valve closes.

At (226), (228), (230), and either (232) or (250), method (200) includes closing the valve if a max hot fill time has elapsed or if water flowing into the tub has met a predetermined water pressure level. As depicted in FIG. 3A, after the hot water valve 88 is opened at (224) to flow water into tub 64, hot water valve 88 remains open until the condition at (226) or the condition at (228) is met. As shown in FIG. 3, for this implementation, at (226) method (200) includes determining whether a max fill time has elapsed. For this exemplary implementation, the max fill time is a max hot fill time. The max hot fill time may be any suitable time that allows water to fill into tub 64, e.g., thirty seconds (30 s), one minute (1 min.), or some other suitable time. Preferably, in some implementations, the max hot fill time is set such that under normal conditions (i.e., all components of washing machine appliance 50 and components fluidly connected thereto are in working order) water is allowed to flow into tub 64 such that the predetermined water pressure level may be met. In this way, the hot water valve 88 will allow a volume of water to flow into tub 64 that will meet the predetermined water pressure level each time calibration cycle is run unless washing machine appliance 50 is experiencing some issue.

If the max hot fill time has not elapsed as determined at (226), method (200) proceeds to (228). At (228), as tub 64 continues to fill with water, method (200) includes determining whether the water flowing into the tub has met a predetermined water pressure level. For instance, controller 100 may receive one or more signals from pressure sensor 110 indicative of the water pressure applied to pressure sensor 110 by the water filling into tub 64. In this way, controller 100 may track the water pressure level of the water within tub 64. The predetermined water pressure level may be any suitable pressure level, such as e.g., ten (10) inches of water. For this implementation of method (200), it will be appreciated that cold water valve 86 has already been opened to flow a volume of water into tub 64 and that cold water valve 86 was closed due to the cold water within tub 64 meeting the predetermined water pressure level at (220). Thus, when determining whether the hot water flowing into the tub has met the predetermined water pressure level at (228), controller 100 must take into account that cold water is already present in the tub 64.

If the hot water flowing into the tub has not met the predetermined water pressure level at (228), then method (200) loops back to (226) where controller 100 checks whether the max hot fill time has elapsed. Method (200) repeatedly iterates through (226) and (228) until the max fill time has elapsed or the hot water flowing into the tub has met the predetermined water pressure level. If the max hot fill time has elapsed as determined at (226) prior to when hot water flowing into the tub has met the predetermined water pressure level, method (200) proceeds to (250). If, however, the water flowing into the tub 64 has met the predetermined water pressure level as determined at (228) prior to the max hot fill time elapsing, method (200) proceeds to (230) and (232) where the timer is stopped and hot water valve 88 is closed, respectively. The timer, having started on the hot water valve opening and having ended on the hot water valve closing, has kept the hot fill time. The hot fill time may be stored in one or more of the memory devices of controller 100 such that it may be used for calculating the water flow rate through the hot water valve 88.

In some implementations of method (200), (224), (226), (228), (230), and (230) or (250) may be performed prior to (216), (218), (220), and (222). That is, hot water valve 88 may opened and closed for calibration purposes prior to cold water valve 86 being opened and closed for calibration purposes. Stated yet another way, the valves of washing machine appliance 50 may be tested in any suitable order.

At (234), after closing the valve at (232), method (200) includes determining whether a water pressure of the water within the tub has changed over a predetermined period. Stated differently, it is determined at (234) whether the volume of water within tub 64 is increasing or decreasing despite the fact that drain pump 90 has not been activated and that both cold and hot water valves 86, 88 are closed. The predetermined time may be any suitable time, e.g., thirty seconds (30 s). If the water pressure of water within the tub 64 has not changed over the predetermined period, there are no stuck valve or leak issues, and accordingly, method (200) proceeds to (238). If, however, the water pressure of water within the tub 64 has changed over the predetermined period, then there is either a stuck valve issue or a leak issue and method (200) proceeds to (236).

At (236), if the water pressure of the water within the tub has changed over the predetermined period, method (200) includes notifying a user that a stuck valve condition exists (if the water pressure is increasing) or that a leak condition exists (if the water pressure is decreasing). In particular, if the water pressure is increasing (i.e., if the volume of water within tub 64 is increasing), then controller 100 determines that a stuck valve condition exists. For instance, one or both of cold and hot water valves 86, 88 may have a stuck value issue. Stuck valve conditions may occur, for example, if the solenoid armature jams. When such stuck valve conditions occur, if left uncorrected, endless water may flow to tub 64. Accordingly, it may be prudent to notify a user of such stuck valve condition at (236). Further, if the water pressure is decreasing (i.e., if the volume of water within tub 64 is decreasing), then controller 100 determines that a leak condition exists. Accordingly, at (236), a user is notified of such condition so that corrective action may be taken.

Washing machine appliance 50 may notify a user of such conditions at (236) in any suitable manner, such as e.g., in any of the ways noted at (212). In further implementations of method (200), additionally or alternatively, method (200) includes logging a stuck valve condition fault (if the water pressure is increasing) or a leak condition fault (if the water pressure is decreasing). In this way, for example, if washing machine appliance 50 is serviced, an operator, service professional, or consumer may quickly ascertain the issue with washing machine appliance 50 and take corrective action.

At (238), in some implementations, after determining that the water pressure of the water within the tub has not changed over the predetermined period, method (200) includes draining water from the tub until the water pressure level is less than or equal to the minimum pressure threshold. Stated differently, the water is drained from tub 64 at (238) until the pressure exerted on the pressure sensor 110 by the volume of water within tub 64 is less than the minimum pressure threshold. Once the water pressure level of the water within tub 64 is less than or equal to the minimum pressure threshold, washing machine appliance 50 is ready to resume normal operations, e.g., to perform wash cycles.

At (240), method (200) includes calculating, if water flowing into the tub has met the predetermined water pressure level, a water flow rate based at least in part on a fill time extending from a time in which the valve opens to a time in which the valve closes and a pressure of the water in the tub at the predetermined water pressure level. For instance, as depicted in FIG. 3B, if the cold water flowed into tub 64 met the predetermined water pressure level at (220) and the hot water flowed into tub 64 met the predetermined water pressure level at (228), the water flow rates through the cold and hot valves 86, 88 are calculated based at least in part on the cold fill time and the hot fill time, respectively, and the pressure of the water within the tub 64 at the respective predetermined water pressure levels.

In some implementations, for example, the flow rates are calculated by cross-referencing the fill time with a volume of water within the tub in a look-up table. More particularly, when water within tub 64 has met the predetermined water pressure level associated with a particular valve, the height of the water level is known. Once the water level height is known, the volume of the water within tub 64 is known as the dimensions of the tub 64 are also known. Thus, in knowing the height of the water level (by sensing the water pressure with pressure sensor 110), the volume of water within tub 64 is known. Further, as timer has kept the cold fill time and hot fill time, the fill times of the cold and hot water valves 86, 88 are also known. Accordingly, by knowing the volume of water within tub 64 at the predetermined water pressure levels and the hot and cold fill times, the cold water flow rate and the hot water flow rate may each be determined, e.g., by cross-referencing the fill time with the volume of water within the tub in a look-up table.

At (242), the method (200) includes determining whether the flow rates are in a valid range. For this exemplary implementation, it is determined whether the calculated cold water flow rate is in a valid range and it is determined whether the calculated hot water flow rate is in a valid range. For instance, controller 100 may have a valid flow rate table stored in one or more memory devices that includes valid flow rates for the cold water flow rate and the hot water flow rate. The valid range for the cold water flow rates may be different from the valid range for the hot water flow rates or the valid ranges may be the same. After the cold and hot water flow rates are calculated at (240), the cold and hot water flow rates are compared to their respective valid flow rate ranges using the flow rate table. If one or both of the flow rates are not within their respective valid ranges, then method (200) proceeds to (246). If, however, the flow rates are within their respective valid ranges, then method (200) proceeds to (244).

At (244), method (200) includes notifying a user that no conditions were found in the washing machine appliance during the calibration cycle. Further, in some implementations, additionally, method (200) includes notifying a user that the valves are properly calibrated. Stated differently, the user is notified that the flow rates of the valves are within their respective valid ranges. For instance, for this implementation, if the calculated cold water flow rate and the calculated hot water flow rate are each within their respective valid flow rate ranges, then washing machine appliance 50 notifies a user that the cold and hot water flow rates are valid Washing machine appliance 50 may notify a user that issues or conditions have been found at (244) during the calibration cycle in any suitable manner, such as e.g., in any of the ways noted at (212). In further implementations of method (200), additionally or alternatively, method (200) includes logging a no-conditions event. The no-conditions event may be logged in a memory device of controller 100 and may have an associated time stamp. In this way, for example, if washing machine appliance 50 is serviced, an operator, service professional, or consumer may refer no-conditions event and determine that no issues were found at the time the calibration cycle was performed. This may be advantageous in that better maintenance scheduling and servicing of washing machine appliance 50 may be achieved, among other benefits.

At (246), if one or both of the calculated cold water flow rate and the hot water flow rate were found to be invalid at (242), then method (200) includes notifying a user that the flow rates were found to be invalid. Washing machine appliance 50 may notify a user that at least one of the calculated flow rates were found to be invalid at (242) in any suitable manner, such as e.g., in any of the ways noted at (212). In further implementations of method (200), additionally or alternatively, method (200) includes logging an invalid flow rate fault. The fault may associate which of the flow rates were found to be invalid. The invalid flow rate fault may be logged in a memory device of controller 100 and may have an associated time stamp. In this way, for example, if washing machine appliance 50 is serviced, an operator, service professional, or consumer may quickly ascertain the issue with washing machine appliance 50.

At (248), in some implementations, for one or more of the flow rates found to be invalid at (242), method (200) includes applying or setting a new flow rate for future wash cycles of the washing machine appliance based at least in part on the calculated flow rate or rates found to be invalid. As noted previously, when washing machine appliance 50 is performing a wash cycle, washing machine appliance 50 may rely on the flow rate as a parameter in determining the volume of water in tub 64. The volume of water in tub 64 influences the washing machine's performance in washing, rinsing, detangling, and cloth damage; thus, setting the flow rate parameter is of importance. If washing machine appliance 50 is operated in conditions where flow rates are not in accordance with factory settings (i.e., the factory default flow rate settings), calibration of the flow rates and the application of such calculated flow rates as the new flow rate may provide improved wash performance.

In some implementations, prior to setting one or more new flow rates for future wash cycles of the washing machine appliance based at least in part on the calculated flow rate or rates found to be invalid, the calculated water flow rates must be found to be invalid and within a predetermined range for each of a predetermined number of calibration cycles. In this way, there is a degree of confidence that the calculated flow rates are indeed accurate before setting the new flow rates based on the calculated flow rates found to be invalid. For example, suppose the cold water flow rate was found to be invalid during a particular calibration cycle and that the flow rate was within a first predetermined range. Further suppose that the predetermined number of calibration cycles is three (3) cycles. In such implementations, prior to setting the calculated invalid flow rate as the new flow rate, the calculated invalid flow rate must be found to be within the first predetermined range during three (3) separate calibration cycles. Once the calculated invalid flow rate is found within the to be within the first predetermined range during three (3) separate calibration cycles, the new calculated flow rate is set for the first predetermined range, e.g., instead of the factory default flow rate setting.

Further, in some implementations, the calculated invalid flow rate must be found to be within the predetermined range consecutively for the predetermined number of calibration cycles. Once the one or more calculated flow rates are set or applied as the new flow rates, controller 100 may be use the new flow rates as a parameter to determine the volume of water in the tub 64, e.g., during a wash cycle.

At (250), if the max fill time has elapsed as determined at (218) or (226) prior to when water flowing into the tub has met the predetermined water pressure level at (220) or (228), respectively, method (200) includes closing the valve. For this implementation, if the max cold fill time has elapsed as determined at (218) prior to the predetermined water pressure level being met by the cold water flowing into the tub 64 at (220), then cold water valve 86 is closed at (250). Further, if the max hot fill time has elapsed as determined at (226) prior to the predetermined water pressure level being met by the hot water flowing into the tub 64 at (220), then hot water valve 88 is closed at (250). If the max cold fill time has elapsed as determined at (218) prior to the predetermined water pressure level being met by the cold water flowing into the tub 64 at (220) or the max hot fill time has elapsed as determined at (226) prior to the predetermined water pressure level being met by the hot water flowing into the tub 64 at (220), then controller 100 determines that the tub 64 is not filling with water to the designated water pressure level, and consequently, controller 100 determines that tub 64 is not being filled due to a water pipe connection condition. That is, there is likely a leak along one of the cold or hot fluid supply conduits 77, 78.

At (252), in some implementations, after closing the valve at (250), e.g., the cold water valve 86 or the hot water valve 88, method (200) includes draining water from the tub until the water pressure level is less than or equal to the minimum pressure threshold. Stated differently, the water is drained from tub 64 at (252) until the pressure exerted on the pressure sensor 110 by the volume of water within tub 64 is less than the minimum pressure threshold. Once the water pressure level of the water within tub 64 is less than or equal to the minimum pressure threshold, washing machine appliance 50 is ready to resume normal operations, e.g., to perform wash cycles.

At (254), method (200) includes notifying a user that a water pipe connection condition exists. As noted above, if the max fill time has elapsed as determined at (218) or (226) prior to when water flowing into the tub has met the predetermined water pressure level at (220) or (228), respectively, then controller 100 determines that the tub 64 is not filling with water to the designated water pressure level, and consequently, controller 100 determines that tub 64 is not being filled due to a water pipe connection condition. At (254), the water pipe connection condition is reported to a user. Washing machine appliance 50 may notify a user of the water pipe connection condition in any suitable manner, such as e.g., in any of the ways noted at (212). In further implementations of method (200), additionally or alternatively, method (200) includes logging a water pipe connection fault. The fault may associate which of the fluid supply conduits 77, 78 had an issue. The water pipe connection fault may be logged in a memory device of controller 100 and may have an associated time stamp. In this way, for example, if washing machine appliance 50 is serviced, an operator, service professional, or consumer may quickly ascertain the issue with washing machine appliance 50.

At (256), method (200) includes ending the calibration cycle. In this way, washing machine appliance 50 may resume normal operation, e.g., washing machine appliance 50 may resume performing wash cycles. As shown in FIG. 3B, for this exemplary implementation, the calibration cycle is ended at (256) after one of (236), (244), (248), or (250).

In some implementations of method (200), to more quickly test for abnormal conditions, among other reasons, all valves of washing machine appliance 50 may be opened at the same time and a timer may be started, e.g., at (216). For instance, cold water valve 86 and hot water valve 88 may be opened simultaneously. Thereafter, method (200) includes following the same process as outlined at (218), (220), and (222). In this way, a net flow rate may be calculated, e.g., at (240), and method (200) may further include determining whether the net flow rate is in a valid range, e.g., at (242). Further, method (200) may proceed as outlined in FIG. 3B.

By operating washing machine appliance 50 in a calibration cycle in accordance with method (200), numerous advantages may be realized. For instance, the water flow rates through the valves of washing machine appliance 50 may be calculated without use of a flow rate sensor, and thus, the cost of the unit may be reduced. Further, such calibration cycles may provide for more robust performance of washing machine appliance 50 over a wide range of water pressures as the flow rate setting of the washing machine appliance 50 may be set in accordance with the actual water pressure conditions experienced by washing machine appliance 50. Further, service technicians and/or consumers may run calibration cycles to improve estimated wash cycle times, e.g., by using adapted or modified flow rates based on the flow rates calculated during a calibration cycle. Further, such calculated flow rates may be collected and provided to a manufacturer of washing machine appliances configured to run such calibration cycles. In addition, washing machine appliances equipped with features that may execute the calibration cycle of method (200) provide a means for detecting and determining the cause of pressure issues in such washing machine appliances. For instance, draining conditions, stuck valve conditions, water pipe connection conditions, invalid flow rates, etc. may be identified and users may be notified of such conditions. Moreover, faults may be logged to assist users with diagnosing issues and solving issues.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a washing machine appliance in a calibration cycle, the method comprising:
    opening a valve to flow water into a tub;
    closing the valve when a max fill time has elapsed or when water flowing into the tub has met a predetermined water pressure level;
    calculating, when water flowing into the tub has met the predetermined water pressure level, a water flow rate based at least in part on a fill time extending from a time in which the valve opens to a time in which the valve closes and a pressure of water in the tub at the predetermined water pressure level;
    determining whether the water flow rate is in a valid range; and
    generating a control action in response to whether the water flow rate is in the valid range.

2. The method of claim 1, wherein when the water flow rate is in the valid range, the control action comprises notifying a user that no conditions were found in the washing machine appliance during the calibration cycle.

3. The method of claim 1, wherein when the water flow rate is not in the valid range, the control action comprises notifying a user that the water flow rate is not in the valid range.

4. The method of claim 1, wherein when the water flow rate is not in the valid range, the control action comprises setting a new water flow rate based at least in part on the calculation of the water flow rate, for future wash cycles of the washing machine appliance.

5. The method of claim 4, wherein prior to setting the new water flow rate based at least in part on the calculation of the water flow rate, the water flow rate must be calculated within a predetermined range for a consecutive predetermined number of calibration cycles.

6. The method of claim 4, wherein prior to setting the new water flow rate based at least in part on the calculation of the water flow rate, the water flow rate must be calculated within a predetermined range for each of a predetermined number of calibration cycles.

7. The method of claim 1, wherein the valve is a cold water valve, and wherein the method further comprises:
    opening a hot water valve to flow water into the tub;
    closing the hot water valve when a max hot fill time has elapsed or when water flowing into the tub has met a predetermined hot water pressure level;
    calculating, when water flowing into the tub has met the predetermined hot water pressure level, a hot water flow rate based at least in part on a hot water fill time extending from a time in which the hot water valve opens to a time in which the hot water valve closes and the pressure of water in the tub at the predetermined hot water pressure level;
    determining whether the hot water flow rate is in a valid range; and
    generating a control action in response to whether the hot water flow rate is in the valid range.

8. The method of claim 1, wherein when the valve is closed due to the max fill time elapsing before water flowing into the tub has met the predetermined water pressure level, the method further comprises:
    draining water from the tub until a minimum water pressure level is met; and
    notifying a user that a water pipe connection condition exists.

9. The method of claim 1, wherein when the valve is closed due to the predetermined water pressure level being met prior to the max fill time elapsing, wherein after closing the valve, the method further comprising:
    determining whether a water pressure of water within the tub has changed over a predetermined period.

10. The method of claim 9, wherein when the water pressure of water within the tub has changed over the predetermined period, the method further comprises:
    notifying, when the water pressure of water within the tub has increased over the predetermined period, a user that a stuck valve condition exists.

11. The method of claim 9, wherein when the water pressure of water within the tub has changed over the predetermined period, the method further comprises:
    notifying, when the water pressure of water within the tub has decreased over the predetermined period, a user that a leak condition exists.

12. The method of claim 1, wherein when the valve is closed due to the predetermined water pressure level being met prior to the max fill time elapsing, wherein after closing the valve, the method further comprising:
    draining water from the tub until the water pressure level is less than or equal to a minimum pressure threshold.

13. The method of claim 1, wherein prior to opening the valve, the method further comprises:
    determining whether a water pressure level is greater than a minimum pressure threshold;
    draining, when the water pressure level is greater than the minimum pressure threshold, water from the tub until the water pressure level is less than or equal to the minimum pressure threshold or when a predetermined drain time has elapsed.

14. The method of claim 13, wherein when the predetermined drain time has elapsed, the method further comprises:
    notifying a user that a drain condition exists.

15. The method of claim 1, wherein upon opening the valve, the method further comprises:
    starting a timer to keep the fill time.

16. The method of claim 1, wherein calculating the water flow rate based at least in part on the fill time and the pressure of water in the tub at the predetermined water pressure level comprises:

cross-referencing the fill time with a volume of water within the tub in a look-up table.

17. A washing machine appliance configured for operating a calibration cycle, the washing machine appliance comprising:

a tub;

a basket rotatably mounted within the tub, the basket defining a wash chamber for receipt of articles for washing;

a valve in fluid communication with an external water source, the valve configured to selectively allow water to flow into the tub;

a nozzle in fluid communication with the valve and configured for flowing water into the tub;

a pressure sensor mounted in the tub;

a controller in operative communication with the valve and the pressure sensor, the controller configured to:

open the valve to flow water into the tub;

close the valve when a max fill time has elapsed or when water flowing into the tub has met a predetermined water pressure level;

calculate, when water flowing into the tub has met the predetermined water pressure level, a water flow rate based at least in part on a fill time extending from a time in which the valve opens to a time in which the valve closes and a pressure of water in the tub at the predetermined water pressure level;

determine whether the water flow rate is in a valid range; and generate a control action in response to whether the water flow rate is in the valid range.

18. The washing machine appliance of claim 17, wherein when the valve is closed due to the predetermined water pressure level being met prior to the max fill time elapsing, wherein after the valve is closed, the controller is further configured to:

determine whether a water pressure of water within the tub has changed over a predetermined period; and notify, when the water pressure of water within the tub has increased over the predetermined period, a user that a stuck valve condition exists.

19. The washing machine appliance of claim 17, wherein when the water flow rate is not in the valid range, the control action comprises setting a new water flow rate based at least in part on the water flow rate calculated for future wash cycles of the washing machine appliance, and wherein prior to setting the new water flow rate based at least in part on the water flow rate calculated, the water flow rate must be calculated within a predetermined range for a consecutive predetermined number of calibration cycles.

20. The washing machine appliance of claim 17, wherein the valve is a cold water valve and the external water source is an external cold water source, and wherein the washing machine appliance further comprises:

a hot water valve in fluid communication with an external hot water source, the hot water valve configured to selectively allow water to flow into the tub, and wherein after the cold water valve is closed by the controller, the controller is further configured to:

open the hot water valve to flow water into the tub;

close the hot water valve when a max hot fill time has elapsed or when water flowing into the tub has met a predetermined hot water pressure level;

calculate, when water flowing into the tub has met the predetermined hot water pressure level, a hot water flow rate based at least in part on a hot water fill time extending from a time in which the hot water valve opens to a time in which the hot water valve closes and the pressure of water in the tub at the predetermined hot water pressure level;

determine whether the hot water flow rate is in a valid range; and generate a control action in response to whether the hot water flow rate is in the valid range.

* * * * *